July 5, 1932.  A. D. MacLEAN ET AL  1,865,870
LIQUID SEAL DEVICE FOR REGULATORS
Filed Dec. 2, 1929
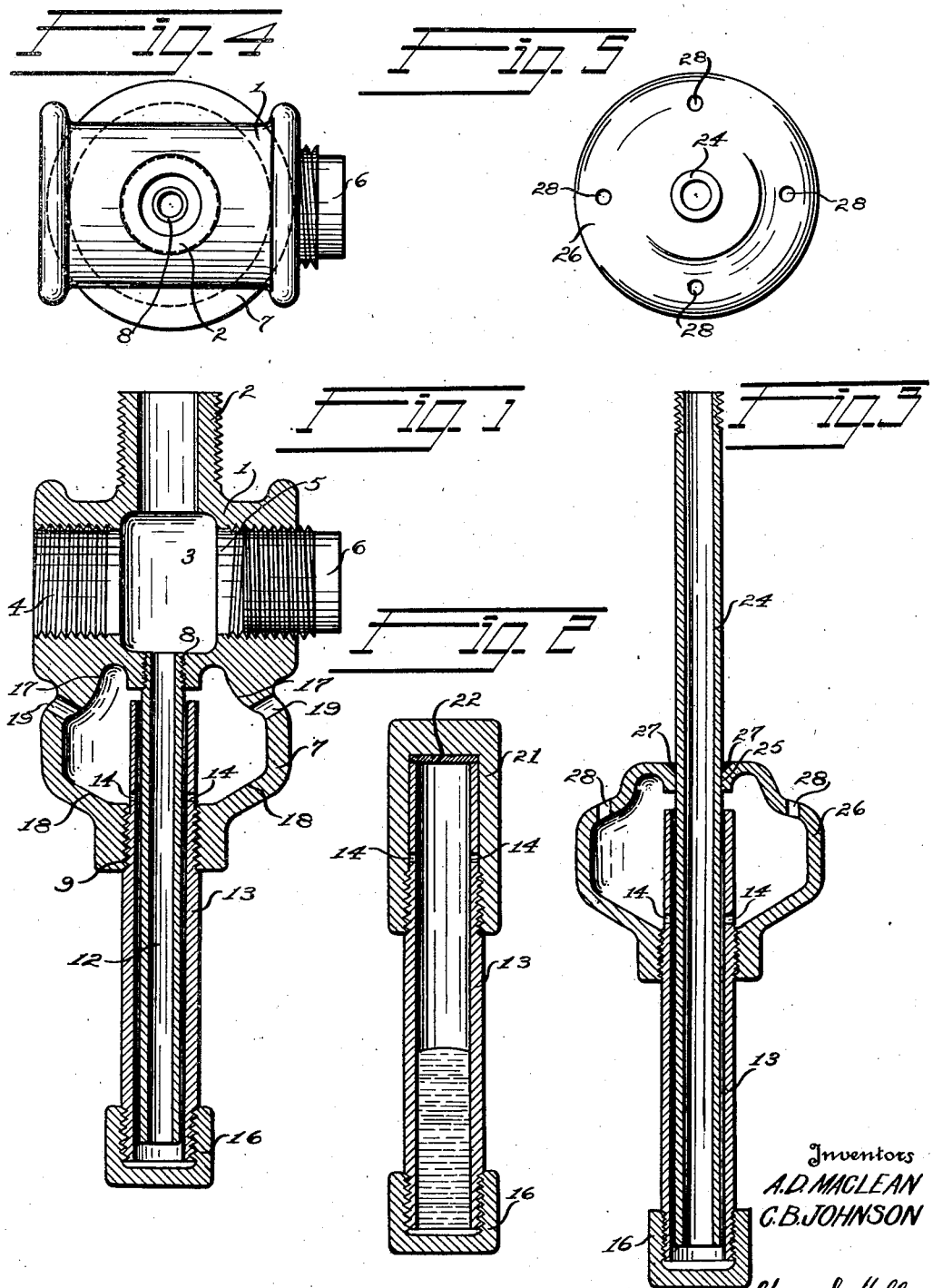
Inventors
A.D. MACLEAN
C.B. JOHNSON
Strauch+Hoffman
Attorneys Patented July 5, 1932

1,865,870

UNITED STATES PATENT OFFICE

ALLEN D. MacLEAN AND CHARLES B. JOHNSON, OF PITTSBURGH, PENNSYLVANIA, ASSIGNORS TO PITTSBURGH EQUITABLE METER COMPANY, OF PITTSBURGH, PENNSYLVANIA, A CORPORATION OF PENNSYLVANIA

LIQUID SEAL DEVICE FOR REGULATORS

Application filed December 2, 1929. Serial No. 411,097.

This invention relates to a liquid sealing device, and more particularly to a liquid seal for use with gas regulators, although not limited to such use.

In the art of the distribution of fluids such as gases, it is quite common to provide flow controlling devices, metering devices, pressure regulators, and other devices, in which it is desirable to provide safety devices to allow the relief of excessive pressure. Usually such safety devices comprise a column of liquid, such for example as mercury, open to the pressure of the fluid at one side and to atmospheric pressure at the other side. However, prior liquid seals have been open to the objection that under heavy pressure part of the liquid has been blown completely out of the seal and lost, thus destroying the accuracy of adjustment, and resulting in the necessity of comparatively frequent attention to maintain them in reasonably satisfactory operating condition.

Accordingly one object of our present invention is to provide a liquid seal or vent arrangement in which no substantial loss of the liquid occurs during the relief of excessive pressures in operation.

Another object of the present invention is to provide novel liquid seals so designed as to relieve excessive pressure and which will automatically reset to correct adjustment without loss of the liquid such as mercury and without manual attention when the excessive pressures have been relieved.

In prior forms of liquid seals it has been customary to provide instructions for installation, such instructions including detailed directions to pour in a quantity of the sealing liquid until a set level is reached. The installation mechanic must follow these specific directions in charging the seal, as the accuracy and sensitivity of the seal is dependent upon the exact quantity of liquid inserted; it is thus subjected to the hazard of human error. Also, if for any reason the liquid seal is damaged after the initial installation, such for example as by loss of liquid occurring during venting of excess pressure it is necessary to send a skilled mechanic to repair the seal and insert the proper quantity of liquid.

Therefore, another object of our invention is to provide liquid seals in which a shipping cartridge is used containing the exact quantity of liquid required, this cartridge being adapted for bodily association with the sealing device.

Another object of the present invention is to provide a liquid seal adapted to receive a detachable cartridge which cartridge may be readily inserted and removed by unskilled workmen, the detachable cartridge containing the necessary amount of liquid and requiring no measuring of liquid during installation.

A further object of the invention is to provide combined outlet connections and liquid seals for the low pressure side of a gas regulator adapted to conveniently control a supply of gas to one or more low pressure pipes from a common high pressure source as for example from a tank of fuel or illuminating gas in a bottled gas system.

Still a further object of our invention is to provide a liquid seal that is simple and cheap to manufacture, easy to install and service, and yet extremely durable in use.

These and other objects will be apparent from the following description and from the scope of the appended claims when taken in connection with the accompanying drawing wherein—

Figure 1 is a longitudinal sectional view of one form of complete seal device embodying our invention.

Figure 2 is a sectional view of a shipping cartridge adapted for association with our improved seals.

Figure 3 is a longitudinal sectional view of a modified form of our improved seal.

Figure 4 is a top plan view of the complete seal device of Figure 1.

Figure 5 is a top plan view of the seal device shown in Figure 3.

Referring to the drawings and particularly to Figure 1, a preferred embodiment of our improved seal includes a body portion 1 having a threaded nipple 2, thereon, for detachable association with a gas regulator or other device requiring a liquid seal. The body portion 1, as shown, includes a hollow central casing 3 with internally threaded branches 4 and 5 radiating therefrom. These branches 4 and 5 are adapted for connection to the low pressure mains protected by the pressure regulator. As shown, there are only two passages 4 and 5 for connection to low pressure mains, but obviously the invention is not limited to two mains, and three or four mains could be associated with the body portion 1. When only one pressure main is to be serviced, the remaining openings 4 and 5 are closed by pipe plugs 6, which block off the unused connections.

The body portion 1 has integrally formed therewith a depending chamber 7 which communicates with the central chamber 3, by a threaded bore 8. The lower portion of chamber 7 is contracted and has a threaded bore 9 formed therein. The upper threaded end of elongated pipe 12 is screwed into opening 8 in the body 1, and passes freely through the threaded bore 9 of chamber 7. Pipe 12 is open at its lower end and is surrounded by a second conduit or pipe 13 having threads on the exterior surface thereof adapted to screw into threaded bore 9 of chamber 7 and the upper end of which extends well up the chamber 7 to a point adjacent the lower end of bore 8. It will be noted that the pipes 12 and 13 are of different diameter to provide an annular space between the pipes when assembled.

Just above the threaded portion of the pipe 13 said pipe has a plurality of perforations 14 formed therethrough, within the chamber 7, and adjacent the bottom portion thereof. The lower end of pipe 13 is closed by a cap 16, screw-threadedly engaged thereon and preferably welded in place.

As seen more particularly in Fig. 1, chamber 7 has upper curved wall 17, which flares outwardly and downwardly and lower-wall 18 which flares outwardly and upwardly. Upper wall 17 and lower wall 18 are connected by substantially vertically disposed wall of the chamber 7. Adjacent the points where the upper walls 17 merge into the vertically disposed portions of the chamber 7, there are provided a plurality of vent openings 19.

It will be noted that the pipe 13 may be readily detached from the remaining portions of the liquid seal by merely unscrewing said pipe from the threaded opening 9, and used as a shipping cartridge for the desired quantity of liquid. When so used, pipe 13 is filled with the desired quantity of sealing liquid such as mercury, at the factory, and the upper end of pipe 13 is closed by a removable cap 21, as seen in Figure 2. Cap 21 is threaded for engagement with the threaded portion of pipe 13 and closes the upper open end of pipe 13 and also closes the perforations 14. If found desirable a leather or rubber washer 22 may be interposed in cap 21 over the upper end of pipe 13 for sealing the liquid within the pipe.

As thus arranged, pipe 13 may be filled with the exact quantity of liquid necessary for the particular installation and the cap 21 may then be screwed into place and sealed if desirable. Shipping cartridges made up in this way may then be forwarded with the complete liquid seal device without danger of loss of liquid from the cartridge. When the device is installed in service the mechanics do not have to measure out a desired quantity of liquid and pour the same into the seal, since it is only necessary to remove cap 21 from the shipping cartridge and screw pipe 13 into the threaded opening 9 of the chamber 7. Thus the desired quantity of liquid is always initially in the seal and the possibility of human error is practically eliminated. Also if in use of the seal any liquid is lost therefrom by breakage or accident, it is only necessary for the user of the device to have an extra cartridge containing the desired quantity of liquid therein on hand, and to merely unscrew the old pipe 13, remove cap 21 from the cartridge, and screw new pipe 13 into position. This simple interchangeability of shipping cartridges containing the necessary quantities of liquid is greatly desirable in gas regulators associated with bottled gas, normally dispensed from tanks or containers under high pressure, which are put into position within a house and connected up with the low pressure mains of the house. In such bottled gas systems it is necessary that the pressure on the low pressure main of the house be automatically regulated, and that a safety device such as the above described liquid seal be associated with the low pressure main to prevent excess pressure therein. The householder may be provided with one or more service cartridges, such as shown in Fig. 2, with simple instructions to close the valve leading to the low pressure main, remove the old cartridge 13 and insert a fresh cartridge whenever the liquid therein has become lost for any reason.

In the design of the chamber 7, as above shown, the possibility of loss of liquid due to excessive pressure on the low pressure main is practically eliminated, since excess pressure from chamber 3 passing down through central pipe 12 forces the liquid upwardly between the pipe 12 and pipe 13, throwing said liquid, usually mercury, out against the outwardly flaring and curved walls 17 of the chamber 7. The liquid is thus deflected downwardly toward the bottom of chamber 7 away from the perforations 19 in said chamber. The excess gas passes out of the openings 19 and the mercury or other liquid which has been blown out between tubes 12 and 13 strikes upper curved wall 17, is deflected, and falls to the bottom against the converging wall 18 of chamber 7, and passes back through perforations 14 in pipe 13 to automatically recharge the liquid seal device. Due to the interior configuration of the chamber 7, the liquid of the seal is deflected away from the vent openings 19 by wall 17 and towards perforations 14, thereby preventing the liquid from being blown out through vent openings with the gas. This results in the very important advantages of our invention, that substantially no mercury or liquid is lost during venting operations and the seal automatically resets itself for future operation as soon as the excess pressure has been dissipated through openings 19.

In the modification shown in Fig. 3, the inner tube for conduit 12, as seen in Fig. 1, is replaced by an elongated pipe 24 which extends upwardly through opening 25 in the chamber 26, and is welded to said chamber 26 as at 27. This pipe 24 is threaded at its upper end to be secured in a suitably threaded complemental bore in the outlet chamber of a pressure regulator, such for example, as is shown in co-pending application Serial No. 321,681, filed November 24, 1928. Chamber 26 is provided with openings 28 corresponding to openings 19 of Fig. 1, and the walls of this chamber are correspondingly flared outwardly, as described in connection with Fig. 1, to provide means whereby the liquid thrown up into chamber 26 is deflected away from the vent openings 28 therein. In this modification, the use of the body portion 1 is eliminated since the tube 24 screws directly into the pressure regulator. In 1e form shown in Figure 3, the entire liquid seal may be assembled at the factory and the desired quantity of liquid poured therein, and a cap may be screwed on the upper end of pipe 24, which cap is similar to cap 21 of Figure 2. When the liquid seal is to be installed it is only necessary to remove the cap and screw the pipe 24 into position on the pressure regulator. However, in many installations, the chamber 26 with pipe 24 welded thereto will be assembled with the pressure regulator at the factory, in which case the pipe 13 with a cap 21 will be the shipping cartridge as in Figures 1 and 2.

It is believed that the operation of the device will be obvious from the above description. Due to pressure within the pipes 12 or 24, the liquid contained therein will be forced downwardly out of the open lower end thereof, and up into the annular space between the pipes 12 and 13. If excessive pressure occurs, the liquid is blown upwardly into the annular spaced drain pipes 12 and 13, and into chamber 7, but is deflected away from the opening 19 and falls to the bottom of chamber 7 and passes through perforations 14 back into the device to recharge the same.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim as new and desire to secure by United States Letters Patent is:—

1. A liquid seal device for pressure regulators comprising an annular chamber, a passageway through the upper wall of said chamber, a depending pipe secured in said passageway and passing through said chamber, a second pipe surrounding the first pipe and concentrically spaced therefrom and terminating within said chamber at one end and extended beyond said first pipe at the other end, said second pipe being detachably secured to the lower wall of said annular chamber by screw threads, means closing the lower end of said second pipe, and a threaded cap for engagement over the end of said pipe to form a closed shipping cartridge for sealing liquid.

2. In a liquid seal device for pressure regulators, a casing adapted to be connected to a source of pressure, a liquid containing shipping cartridge comprising a pipe, means to close the lower end thereof, means on the other end of said pipe for the detachable reception of a closure member, and cooperating means on said casing for engagement with the means on said pipe to detachably secure said pipe to said casing.

3. A liquid seal device for pressure regulators comprising a chamber with aligned openings in the upper and lower walls thereof, a pipe passing completely through said openings and beyond said chamber in both directions and secured to said chamber adjacent one opening, a second concentric pipe surrounding said first pipe and spaced therefrom, said second pipe terminating within said chamber at one end and extending below said first pipe at the other end, means to close the lower end of said second pipe, and means on the upper end of said first named pipe for detachable engagement with a pressure regulator or the like.

In testimony whereof I affix my signature.
ALLEN D. MacLEAN.
In testimony whereof I affix my signature.
CHAS. B. JOHNSON.